United States Patent [19]

Strassel

[11] 4,364,886
[45] Dec. 21, 1982

[54] PROCESS FOR THE MANUFACTURE OF POLYVINYLIDENE FLUORIDE - INCOMPATIBLE POLYMER LAMINATES

[75] Inventor: Albert Strassel, Oullins, France

[73] Assignee: Chimiques Ugine Kuhlmann, Courbevoie, France

[21] Appl. No.: 236,821

[22] Filed: Feb. 23, 1981

[30] Foreign Application Priority Data

Mar. 7, 1980 [FR] France ............... 80 05151

[51] Int. Cl.³ .................. B29D 9/00; B29D 7/02; B29F 3/00
[52] U.S. Cl. .................. 264/171; 264/259; 264/250; 264/266
[58] Field of Search .............. 428/421, 422, 519; 264/171, 255, 250, 259, 266

[56] References Cited

U.S. PATENT DOCUMENTS

| | | | |
|---|---|---|---|
| 2,774,702 | 12/1956 | Smith | 428/422 |
| 3,524,906 | 8/1970 | Schmitt et al. | 428/421 |
| 3,565,985 | 2/1971 | Schrenk et al. | 264/171 |
| 4,051,293 | 9/1977 | Wiley | 264/171 |
| 4,189,520 | 2/1980 | Gauchel | 428/519 |
| 4,215,177 | 7/1980 | Strassel | 428/421 |
| 4,230,768 | 10/1980 | Hamada et al. | 428/519 |
| 4,291,099 | 9/1981 | Strassel | 264/271 |
| 4,301,212 | 11/1981 | Cohnen et al. | 428/421 |

*Primary Examiner*—Willard E. Hoag
*Attorney, Agent, or Firm*—Sigalos & Levine

[57] ABSTRACT

The process of forming a laminate by molding, preferably either by compression or injection molding, a polymer which is incompatible with $PVF_2$ onto the surface of a preformed laminate sheet of a $PVF_2$ and a polyalkyl methacrylate, with the preformed laminate have been previously obtained by the coextrusion of the $PVF_2$ and polyalkyl methacrylate.

5 Claims, No Drawings

PROCESS FOR THE MANUFACTURE OF POLYVINYLIDENE FLUORIDE - INCOMPATIBLE POLYMER LAMINATES

BACKGROUND OF THE INVENTION

Polymers which are either compression molded or injection molded rarely present the combination of properties that one would wish to encounter, particularly a good resistance to atmospheric aging. Usually during the course of time, regardless of whether they are thermoplastic or thermosetting, the pigmentation and mechanical properties of the polymers are altered by the action, among other things, of ultraviolet rays and of corrosive atmospheric agents.

However, polyvinylidene fluoride ($PVF_2$) is known for its properties of resistance to ultraviolet rays and to corrosive chemical agents, which are peculiar to fluorinated resins, and so it has long been desired to use these properties of fluorinated resins for the protection of other polymers. The implementation of this idea has, however, never been able to be put into practice on molded polymers which are incompatible with $PVF_2$ because of another property of the latter, which in the present case is a drawback; namely, the non-adherence to incompatible polymers.

It has been considered to protect parts after molding by gluing a sheet of $PVF_2$ onto them. Besides the fact that this technique requires a complex manipulation, the result obtained is only imperfect and exhibits the drawbacks inherent in gluing processes which in time are manifested in incidents of ungluing (detachment).

SUMMARY OF THE INVENTION

The process according to the invention has the advantage not only of eliminating adhesives, hence accessorily of eliminating the manipulation of more or less toxic solvents, but also of obtaining a homogeneous laminate unitary in its structure which prevents all possibilities of a future delamination.

Briefly, the process consists of forming a laminate by molding, preferably by either compression or injection molding a polymer which is incompatible with $PVF_2$ onto the surface of a preformed laminate of a $PVF_2$ and a polyalkyl methacrylate, with this preformed laminate having previously been obtained by the coextrusion of the $PVF_2$ and polyalkyl methacrylate.

DETAILED DESCRIPTION

Besides the advantages already having been cited, the instant process makes it possible to avoid all later manipulation of the molded part, to obtain a flawless external appearance of the part, and above all makes it possible to obtain a unitary and homogeneous laminate. This laminate can be compared to an alloy with regard to the three components, such as can be imagined after, for instance, a blending of the components in the molten state, whereas by gluing one obtains a heterogeneous material composed of a juxtaposition of the $PVF_2$/polymer, with an interface composed of the adhesive agent.

Prior to molding, a sheet of $PVF_2$ which is covered on one of its surfaces with a polyalkyl methacrylate film is prepared by coextrusion. Generally speaking, three methods of proceeding with the coextrusion of thermoplastics from two conventional extruders are known.

The first method consists of extruding the polymers separately and of uniting them on coming out of the die. The second method consists of feeding a single die having two ducts by means of two extruders. The polymer streams meet on the level of the lips of the die, thus practically just prior to the outlet of the latter. The third method consists of feeding a stream distributor by means of two extruders. In this stream distributor the polymers unite into a single stream which feeds the die. According to these methods, the respective flow rates of the extruders customarily make it possible to regulate the relative thicknesses of the extruded polymers.

Although all of the $PVF_2$'s yield more or less satisfactory results, the best results are obtained with a $PVF_2$ which is located in such an apparent viscosity range at 200° C. that for at least two velocity gradients of the table shown below it shows apparent viscosities respectively included between the two extreme apparent viscosities shown.

| Velocity Gradient | Values of Apparent Viscosities In Poise | |
|---|---|---|
| Sec-1 | Minimum | Maximum |
| 3.54 | $30 \times 10^3$ | $200 \times 10^3$ |
| 11.81 | $18 \times 10^3$ | $93 \times 10^3$ |
| 35.4 | $11 \times 10^3$ | $47 \times 10^3$ |
| 118 | $6.5 \times 10^3$ | $21 \times 10^3$ |
| 354 | $3.9 \times 10^3$ | $10 \times 10^3$ |
| 1,181 | $2.3 \times 10^3$ | $4.5 \times 10^3$ |

The apparent viscosities under discussion are measured in the known manner by means of a capillary rheometer, by taking RABINOWITCH's correction as applied to non-Newtonian liquids into account.

Copolymers containing at least 70% by weight of $PVF_2$, or also mixtures of $PVF_2$ with other polymers such as, for instance, polyalkyl methacrylates, can be used in place of homopolymers of $PVF_2$.

Although generally speaking the thickness of the layer of $PVF_2$ is unimportant, for economical reasons it is preferable to embody a material in which the thickness of the layer of $PVF_2$ is between 10 microns and several tenths of a millimeter.

The polyalkyl methacrylate preferably is a polymethyl methacrylate (PMMA) whose viscosity in the molten state can be selected from among the viscosity range of commercially available PMMA's, with those skilled in this art knowing the possible means of bringing the viscosity to the desired viscosity by mixing, for instance, with small quantities of fillers or of another polymer; provided, however, that at least 75% by weight of the polyalkyl methacrylate is preserved. Excellent results are obtained with polymethyl methacrylate viscosities between the limits indicated for a velocity gradient given below and measured at 200° C. These values are, however, non-limiting because of the knowledge of those skilled in this art as to how to modify the viscosities as a function of the extrusion temperature.

| Velocity Gradient | Values of Apparent Viscosities in Poise | |
|---|---|---|
| Sec-1 | Minimum | Maximum |
| 3.54 | $100 \times 10^3$ | $500 \times 10^3$ |
| 11.81 | $50 \times 10^3$ | $280 \times 10^3$ |
| 35.4 | $25 \times 10^3$ | $150 \times 10^3$ |
| 118 | $13 \times 10^3$ | $80 \times 10^3$ |
| 354 | $7 \times 10^3$ | $50 \times 10^3$ |
| 1,181 | $3.5 \times 10^3$ | $30 \times 10^3$ |

Not only homopolymers are suitable, but also polymer mixtures or copolymers as long as the product contains at least 30% by weight of polyalkyl methacrylate. The polyalkyl methacrylate can favorably be associated with fluorinated thermoplastics, chlorinated vinyl and vinylidene polymers, styrene polymers, polycarbonate, polyurethanes, the copolymer consisting of styrene/acrylonitrile/grafted acrylic elastomer, the copolymer consisting of acrylonitrile/butadiene/styrene, polyacrylic esters such as polymethyl, polyethyl or polybutyl acrylate, or the copolymers of these acrylic esters with, for instance, vinyl or vinylidene derivatives, or the copolymers of an alkyl methacrylate with, for instance, vinyl chloride, vinyl acetate, methyl acrylate, styrene, isobutylene, acrylic acid, acrylonitrile and methacrylonitrile.

The thickness of the polyalkyl methacrylate is regulated, according to the particular case, between a few microns and 200 microns of thickness. It is, in general, not judicious to operate with greater thicknesses because of the importance which the polyalkyl methacryklate would assume in the mechanical properties of the finished laminate.

The equipment which is useful for the manufacture of the laminate sheet of $PVF_2$ covered with polyalkyl methacrylate consists of standard extruders, die and preferably stream distributor such as they are currently employed in the coextrusion technique for thermoplastics. The thickness of each layer is regulated by the flow rate of each of the extruders.

For the needs of the invention, the temperature of the die is between 180° and 280° C., with this temperature depending on the coextruded materials. The temperatures of the extruders are those customarily provided in the case of the single extrusion of each of the polymers.

In order that the final cohesion between the two polymers is well ensured, it is recommended that the coextrusion of these polymers be carried out in such a way that the materials coming out of the extruders are joined together at the latest on the level of the lips (exit orifice) of the die. In certain cases, the cohesion which is obtained is not entirely suitable and that is why it is preferable for the streams of $PVF_2$ and of polyalkyl methacrylate on coming out of the extruders to travel together and be in contact with each other over a certain length prior to reaching the lips of the die. In the latter case, in place of a die having two ducts, a stream distributor is placed between the outlet of the extruders and a die having a single duct.

The form of intimate bonding resulting between the $PVF_2$ and polyalkyl methacrylate results in a laminate which is a "unitary and homogeneous structure." As used herein, that phrase is meant to distinguish these laminates from those obtained by gluing together separate layers and which exhibit clearly marked interfaces and not a transition zone as is the case with the instant laminate.

Further details of forming the polyvinylidene fluoride-polyalkyl methacrylate laminates are set forth in copending U.S. Application Ser. No. 71,675 filed Aug. 31, 1979 in the name of the instant applicant and are incorporated herein by reference.

The preformed laminate sheet of $PVF_2$ covered by coextrusion with polyalkyl methacrylate and having a total thickness customarily of less than 800 microns is adjusted in the mold, with the non-covered $PVF_2$ surface in contact with the walls of the mold. The temperature of the mold is customarily kept at a temperature between 20° and 160° C. The compression molding or injection molding of the polymer which is incompatible—in the dense or lightened state—which the $PVF_2$ is then carried out under the conventional and standard conditions and by means of the conventional and standard equipment. Generally, the thermoplastic polymers or the thermosetting compositions are injected after closure of the mold. The thermoplastic or thermosetting compositions can also be allowed to flow on the film prior to closure of the mold and placing under pressure. The temperature in the mold is such that it permits an intimate bonding by heat-sealing to take place between the polymer, which is incompatible with $PVF_2$, and the polyalkyl methacrylate of the sheet which will ultimately serve as a protective layer for the final product.

The process according to the invention can be applied with favorable results to thermoplastic and thermosetting polymers which are known to be incompatible with $PVF_2$ but which do adhere to polyalkyl methacrylates, such as, for instance, chlorinated vinyl polymers like polyvinyl chloride or polyvinylidene chloride; styrene polymers and copolymers like polystyrene, impact polystyrene, the copolymer consisting of styrene/acrylonitrile/grafted acrylic elastomer, or the copolymer consisting of acrylonitrile/butadiene/styrene; polycarbonate; polyurethanes; polyolefins such as polyethylene or polypropylene; injectable elastomers; polyester resins, epoxide resins, phenolic resins; as well as vulcanizable rubbers. As used herein with respect to these polymers, the term "incompatible" means adhering poorly or not at all directly to $PVF_2$.

Such a technique is particularly well adapted to the manufacture of car body parts, molded parts for airplane or ship construction and, in general manner, to the manufacture of any molded part which must essentially resist inclement weather or corrosion.

The invention will be further described in connection with the following examples which are set forth for purposes of illustration only.

EXAMPLE 1

Two extruders (SMTP-KAUFMAN) are used. The first extruder, having a diameter of 50 mm, serves to extrude the polyvinylidene fluoride (Foraflon 1000 HD), while the second extruder, having a diameter of 40 mm, serves to extrude the polymethyl methacrylate (KOX 125).

These two extruders feed a stream distributor attached to an ordinary flat die whose purpose it is to manufacture sheets of 200-micron thickness, followed by a calender and a standard pulling train.

The heating temperatures of the extruders range from 190° to 200° C. for the $PVF_2$, and from 180° to 200° C. for the PMMA. The stream distributor and the die are at 210° C.

The flow rate of the extruders is regulated in such a way that a film of 150 microns of thickness of $PVF_2$ and 50 microns of thickness of polymethacrylate is obtained. A perfectly unitary and homogeneous sheet is obtained.

This sheet, with the $PVF_2$ surface against the walls of the mold, is placed into the mold (heated to 130° C.) of an injection press for thermoplastic polymers. After the mold has been closed, a polycarbonate (Markrolon 26-03) is injected at 280° C. under a pressure of 1 N/mm². After 3 minutes, a part made of polycarbonate covered with an adhering exterior protective film of $PVF_2$ is removed from the mold.

EXAMPLE 2

A sheet of PVF$_2$ covered with polymethyl methacrylate and prepared under the conditions of Example 1, with the PVF$_2$ surface against the walls of the mold, is placed into a horizontal metal mold heated to 140° C. A preimpregnated polyester having the following formula in parts by weight is then placed on the film:

Propylene glycol maleophthalate at 60% in styrene (Ugikapon 120 SI): 100
Calcium carbonate (Millicarb): 100
Zinc stearate: 4
Tertiary butyl perbenzoate (Trigonox C): 2
Magnesia: 1
Glass fibers having a length of 25 mm: 65

The mold is closed with the help of a clamp and a pressure of 90 kg/cm$^2$ is maintained for 3 minutes.

A part made of a preimpregnated polyester specimen whose surface is protected by a smooth and shiny film of PVF$_2$ is removed from the mold.

EXAMPLE 3

The two extruders and the stream distributor of Example 1 are used, but the distributor is attached to an ordinary die making it possible to manufacture a sheath by extrusion/blowing. The temperatures of Example 1 are maintained. The polyvinylidene fluoride (Foraflon 1000 HD) is placed into the first extruder, while the following mixture in parts by weight is placed into the second extruder:

Polymethyl methacrylate (Resarite KOX 125): 30
An acrylic rubber (Acryloid KM 323 B): 40
Acrylonitrile/butadiene/styrene copolymer (UGIKRAL SF 10436 made by PCUK): 25
A 1/1 mixture by weight of ZnO/ZnS (Zinc oxide and zinc sulfide): 5

A sheath is obtained which is cut and rolled up in the form of a film. Its total thickness amounts to 150 microns of which 100 microns is PVF$_2$ and 50 microns is the above mixture.

While holding it in place with the help of an adhesive paper, this film is placed between the two open parts of a vertical mold of an injection press for a thermoplastic material. The untreated surface of the PVF$_2$ is in contact with the mold.

The mold is at 110° C. The mold is closed and then an acrylonitrile/butadiene/styrene copolymer (UGIKRAL RA) is injected. The injection screw as well as the spray nozzle are heated to between 250° C. and 270° C. The injection machine is a Billion press of 140 tons. A pressure of 1 N/mm$^2$ is maintained for 2 minutes and the part which is covered on one surface (side) with an adhering PVF$_2$ film is removed from the mold.

EXAMPLE 4

The film of Example 3 is used and with the untreated surface in contact with the mold it is placed on the horizontal part of an open mold at 80° C. A freshly prepared epoxide composition is allowed to run on the treated surface of the film, and the mold is rapidly closed and placed between the two plates, heated to 80° C., of a press. After 8 minutes under a pressure of 80 kg/cm$^2$, an epoxide part covered on one surface with PVF$_2$ is removed from the mold.

Alternatively, after epoxide has been allowed to run on the treated surface of the first film, the operation is repeated by placing a second identical film of Example 3 with the treated surface on the epoxide composition. There is thus obtained an epoxide part covered on its two surfaces with a protective film of PVF$_2$.

EXAMPLE 5

A film identical to the one of Example 3 is placed with its PVF$_2$ surface against the bottom of a horizontal metal mold heated to 130° C. The following polyester composition in parts by weight is allowed to flow onto the film:

Propylene glycol maleophthalate at 64% in styrene (UGIKAPON 77348): 100
Calcium carbonate (OMYA BLR 2): 50
Unmolding agent (ORTHOLEUM 162): 0.4
Butyl perbenzoate (TRIGONOX X215): 1

The mold is closed and a pressure of 8 kg/cm$^2$ is maintained for 4 minutes with the help of a plate press. A polyester part covered with an adhering PVF$_2$ film is removed from the mold.

While the invention has been described in connection with a preferred embodiment, it is not intended to limit the scope of the invention to the particular form set forth, but, on the contrary, it is intended to cover such alternatives, modifications, and equivalents as may be included within the spirit and scope of the invention as defined by the appended claims.

What is claimed is:

1. The process of making a molded article having at least one outer surface of a polyvinylidene fluoride comprising first placing a preformed polyvinylidene fluoride laminate into a compression or injection mold so as to have a polyvinylidene fluoride layer adjacent a wall of the mold, introducing a moldable polymer that is incompatible in terms of adhesion to polyvinylidene fluoride but adherent to polymethyl methacrylate to the mold, and molding at a pressure and temperature sufficient and for a time sufficient to form a shaped laminate; said preformed polyvinylidene laminate having a thickness no greater than about 800 microns and consisting of a polyvinylidene fluoride layer and a polymethyl methacrylate layer and being formed by coextrusion with the polyvinylidene fluoride used to form the laminate having an apparent viscosity, in poises at 200° C., between the minimum and maximum values for at least two of the viscosity gradients set forth below:

| Velocity Gradient | Values of Apparent Viscosities In Poise | |
|---|---|---|
| Sec-1 | Minimum | Maximum |
| 3.54 | 30 × 10$^3$ | 200 × 10$^3$ |
| 11.81 | 18 × 10$^3$ | 93 × 10$^3$ |
| 35.4 | 11 × 10$^3$ | 47 × 10$^3$ |
| 118 | 6.5 × 10$^3$ | 21 × 10$^3$ |
| 354 | 3.9 × 10$^3$ | 10 × 10$^3$ |
| 1,181 | 2.3 × 10$^3$ | 4.5 × 10$^3$ | and the polymethyl methacrylate used to form the laminate having a viscosity, in poises at 200° C., between the minimum and maximum values for any given viscosity gradient set forth below:

| Velocity Gradient | Values of Apparent Viscosities in Poise | |
|---|---|---|
| Sec-1 | Minimum | Maximum |
| 3.54 | 100 × 10$^3$ | 500 × 10$^3$ |
| 11.81 | 50 × 10$^3$ | 280 × 10$^3$ |
| 35.4 | 25 × 10$^3$ | 150 × 10$^3$ |
| 118 | 13 × 10$^3$ | 80 × 10$^3$ |
| 354 | 7 × 10$^3$ | 50 × 10$^3$ |

-continued

| Velocity Gradient Sec-1 | Values of Apparent Viscosities in Poise | |
|---|---|---|
| | Minimum | Maximum |
| 1,181 | $3.5 \times 10^3$ | $30 \times 10^3$ |

2. The process of making a molded article having at least one outer surface of a polyvinylidene fluoride comprising first placing a preformed polyvinylidene fluoride laminate; said laminate consisting of a polyvinylidene fluoride layer and a polyalkyl methacrylate layer and being formed by coextrusion, into a mold so as to have the polyvinylidene fluoride layer adjacent a wall of the mold, introducing into the mold a moldable polymer that is incompatible in terms of adhesion to polyvinylidene fluoride but adherent to said polyalkyl methacrylate and molding at a pressure and temperature sufficient and for a time sufficient to form a shaped laminate.

3. The process of claim 1 wherein the molding is compression or injection molding and the polyalkyl methacrylate is polymethyl methacrylate.

4. The process of claim 2 or 3 wherein the polyvinylidene fluoride used to form said polyvinylidene fluoride layer has an apparent viscosity, in poises at 200° C., between the minimum and maximum values for at least two of the viscosity gradients set forth below:

| Velocity Gradient Sec-1 | Values of Apparent Viscosities In Poise | |
|---|---|---|
| | Minimum | Maximum |
| 3.54 | $30 \times 10^3$ | $200 \times 10^3$ |
| 11.81 | $18 \times 10^3$ | $93 \times 10^3$ |
| 35.4 | $11 \times 10^3$ | $47 \times 10^3$ |
| 118 | $6.5 \times 10^3$ | $21 \times 10^3$ |
| 354 | $3.9 \times 10^3$ | $10 \times 10^3$ |
| 1,181 | $2.3 \times 10^3$ | $4.5 \times 10^3$ |

5. The process of claim 2 or 3 wherein the polyalkyl methacrylate used to form the laminate is a polymethyl methacrylate having a viscosity, in poises at 200° C., between the minimum and maximum values for any given viscosity gradient set forth below:

| Velocity Gradient Sec-1 | Values of Apparent Viscosities in Poise | |
|---|---|---|
| | Minimum | Maximum |
| 3.54 | $100 \times 10^3$ | $500 \times 10^3$ |
| 11.81 | $50 \times 10^3$ | $280 \times 10^3$ |
| 35.4 | $25 \times 10^3$ | $150 \times 10^3$ |
| 118 | $13 \times 10^3$ | $80 \times 10^3$ |
| 354 | $7 \times 10^3$ | $50 \times 10^3$ |
| 1,181 | $3.5 \times 10^3$ | $30 \times 10^3$ |

* * * * *